United States Patent [19]

Atwood

[11] 4,030,364

[45] June 21, 1977

[54] SAFETY GUARD FOR PRESS BRAKES

[75] Inventor: Felix M. Atwood, Richardson, Tex.

[73] Assignee: Square D Company, Park Ridge, Ill.

[22] Filed: May 20, 1976

[21] Appl. No.: 688,436

[52] U.S. Cl. .................................. 72/389; 74/612; 100/53
[51] Int. Cl.[2] ...................... B21D 55/00; F16P 3/00
[58] Field of Search .......... 72/389; 74/612; 83/544; 100/53

[56] References Cited

UNITED STATES PATENTS

| 2,415,462 | 2/1947 | Cherry | 100/53 |
|---|---|---|---|
| 3,213,992 | 10/1965 | Gustafson | 100/53 |
| 3,269,215 | 8/1966 | Lindquist | 74/612 |
| 3,687,060 | 8/1972 | Komori | 100/53 |
| 3,913,413 | 10/1975 | Walker | 74/612 |

FOREIGN PATENTS OR APPLICATIONS

| 604,374 | 7/1948 | United Kingdom | 74/612 |
|---|---|---|---|
| 604,423 | 7/1948 | United Kingdom | 74/612 |

*Primary Examiner*—C.W. Lanham
*Assistant Examiner*—Gene P. Crosby

*Attorney, Agent, or Firm*—Harold J. Rathbun; Carmen B. Patti

[57] ABSTRACT

A safety guard for a press brake includes a sheet of rigid transparent material suspended by a pair of first cables from a frame of the press. A lower edge of the sheet is displaced a predetermined distance above a bed of the press providing just enough room so that a forward portion of a workpiece can be slid beneath the lower edge of the sheet and positioned on the bed of the press without providing additional space through which an operator's hands can be inadvertently extended. An operator holds a rearward portion of the workpiece with both hands as a ram of the press comes down during a work cycle to engage and fabricate or form the forward portion of the workpiece positioned on the bed. Just before the fabrication begins, a second pair of cables connected to the sheet and passing through a series of pulleys alternately on the frame and ram of the press operates, as a consequence to movement of the ram, to rapidly move the sheet out of the way of the workpiece. The workpiece usually requires additional space during the fabrication process as it is formed into a different shape. After the fabrication is completed the ram moves upwardly from the bed, and the sheet quickly returns to its original position.

9 Claims, 5 Drawing Figures

U.S. Patent  June 21, 1977  Sheet 1 of 3  4,030,364
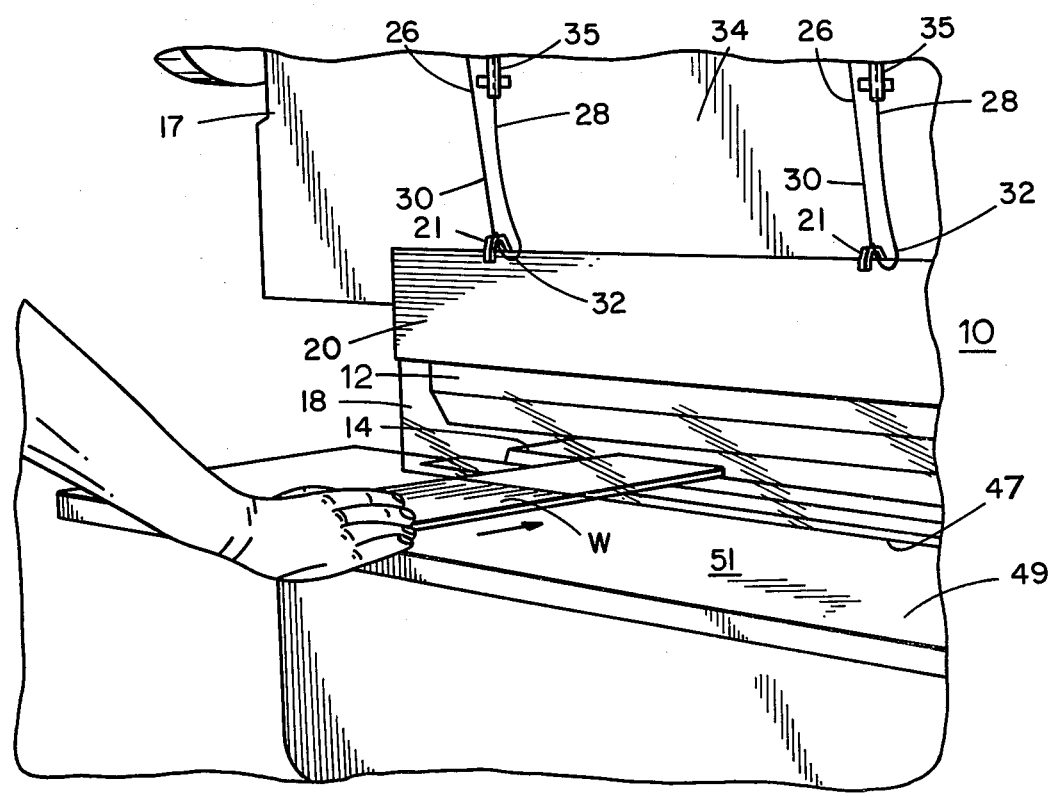
FIG. 1
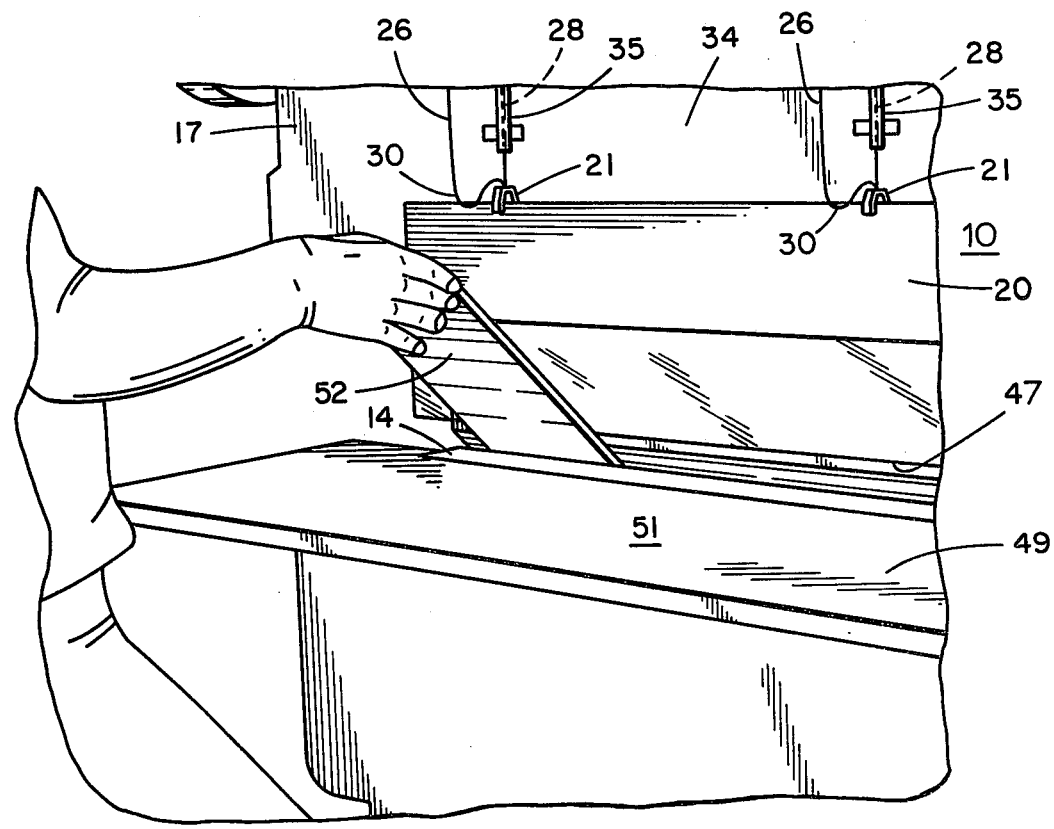

SAFETY GUARD FOR PRESS BRAKES

BACKGROUND OF THE INVENTION

This invention relates to safety guards for presses which have a reciprocating ram cooperating with a bed for fabricating a workpiece, and more particularly to such guards comprising a protective sheet which is moved in and out of a protective position in response to movements of the ram.

Guards for power presses, such as press brakes, are very well known. Existing guards include various means for moving a protective sheet or barrier away from the work area near the press bed as well as means for returning the protective sheet to its protective position prior to the commencement of a work cycle of the press.

A press brake is a press that is operated by the operator using both of his hands to position a workpiece or material on a work area or over a bed of the press. Unlike a punch press where a workpiece is positioned on a work area of the press and the operator then must usually press two buttons before a ram comes down swiftly to engage the workpiece, the press brake is a slower moving machine and both of the hands of the operator are generally required to control a rear portion of the workpiece in order to position a forward portion of the workpiece in the work area. A foot of the operator contacts a pedal which controls reciprocating movement of the ram. Therefore, the types of protective devices used during the work cycle on punch presses, such as control buttons and associated circuitry that requires that both hands of the operator be positioned on the buttons which actuate the press, are not feasible for press brakes.

Existing safety guards for press brakes include very complex mechanical devices, such as hydraulic systems that are interconnected with the foot pedal which the operator uses to control the operation of the press brake ram and thus initiate the work cycle of the press.

Until recently, many press brakes were operated without any protection for the hands of the operator. However, in recent years the enactment of legislation, such as the Occupational Safety and Health Act, directed to protection of the operator of such devices has given rise to a need for an economical, effective and efficient press brake safety guard.

SUMMARY OF THE INVENTION

A guard for a press brake has a rigid transparent sheet suspended above and in front of a bed of the press by a pair of cables connected to a frame of the press. When a ram of the press is at the top of its stroke of the work cycle, the length of these cables is fixed to obtain a predetermined distance between a lower edge of the sheet and the surface of a work ledge. The distance is determined so that the lower edge of the sheet and an upper surface of a workpiece is large enough to permit only the workpiece to be slid onto the bed from the work ledge without leaving any additional space so that the operator cannot inadvertently extend his hands into a work area of the press as he feeds the workpiece into the work area. A second pair of cables, each of which is somewhat slack when the ram is at the top of its stroke, is connected to the sheet and each cable of the second pair extends through respective series of pulleys positioned alternately on the frame and the ram of the press. The remote ends of the cables of the second pair are connected to the ram, and as the ram approaches close to the workpiece on its way to the bottom of its stroke, the slack in each of the second pair of cables in taken up. As the ram continues down to commence the fabrication process on the workpiece, the mechanical advantage provided by the second cables through the two series of pulleys causes the sheet to be rapidly moved upwardly and out of the way of the workpiece during the fabrication process with a velocity proportionately greater than the downwardly moving velocity of the ram. After the fabrication process is completed, the ram begins to move upwardly away from the surface of the bed and the sheet rapidly moves to its initial position and remains there as the ram moves to the top of the stroke.

Accordingly, it is an object and purpose of this invention to provide an improved safety guard for presses, and especially for press brakes which require that the hands of the operator be in the vicinity of the work area to control the workpiece during the work cycle of the press.

It is further object of the invention to provide a safety guard that permits only the workpiece to be positioned on the bed of the press brake and not an operator's hands.

It is further object of this invention to provide a safety guard for a press brake that moves rapidly away from the work area only during the fabrication process with the ram of the brake near the bottom of its stroke so that the fabrication of the workpiece will not be obstructed by the safety guard.

BRIEF DESCRIPTION OF THE DRAWINGS

Other objects and advantages of the present invention will become apparent from the following description wherein reference is made to the accompanying drawings, in which:

FIG. 1 is a perspective view of a portion of a press brake having a guard in accordance with this invention and showing an operator positioning a workpiece on a bed of the press with a ram at the top of its stroke;

FIG. 2 is a perspective view similar to FIG. 1 showing a sheet of the guard in its uppermost position with the ram at the bottom of its stroke after operating on the workpiece;

DETAILED DESCRIPTION OF THE INVENTION

Figure 3:
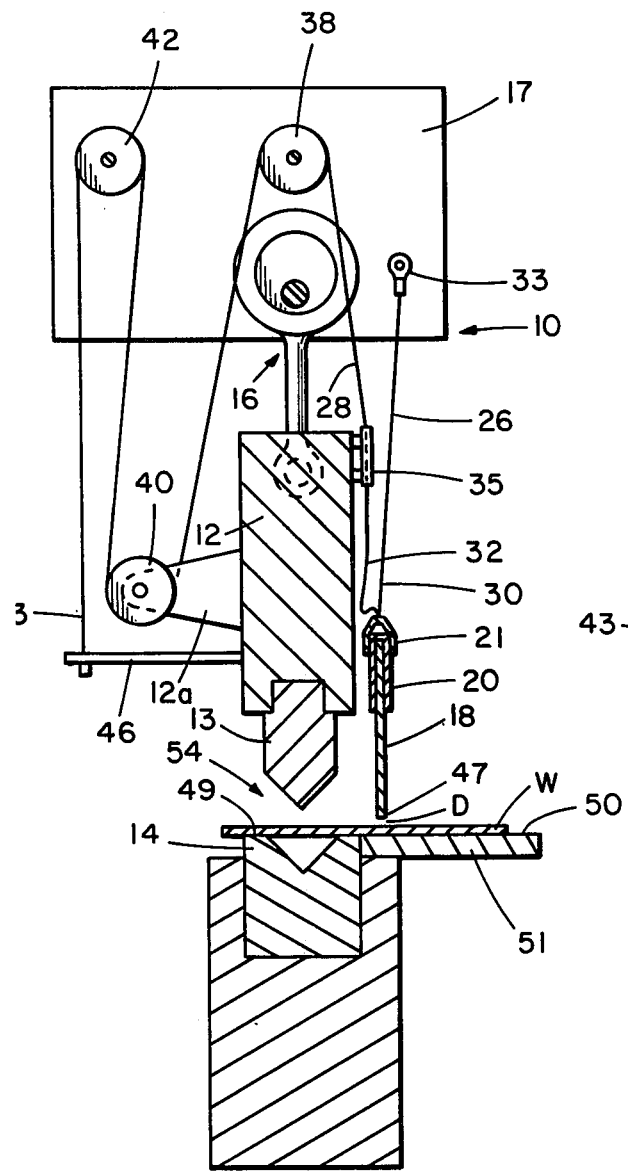
FIG. 3 is a side view of the press with the guard in guarding position and the ram at the top of its stroke as in FIG. 1.

The safety guard of the present invention is shown as applied to a typical press brake 10 having a ram 12, a bed 14, and a reciprocating means 16 operatively connecting the ram 12 to a supporting structure 17 for moving the ram 12 toward and away from the bed 14. The reciprocating means 16 moves the ram 12 during a work cycle from a top position of FIG. 3 through a workpiece-engaging portion 13 of the ram 12 has formed a workpiece W positioned on the bed 14.

The safety guard includes an elongated protective sheet 18 preferably made of rigid transparent material such as acrylic plastic having a metal holder 20 secured along a top portion and a pair of clamps 21 connected to the holder adjacent opposite ends. The sheet 18 preferably extends across the entire area where its absence would permit an operator's hands to enter the work area in the path of movement of the ram 12. A cable system is attached to each clamp 21. Because the two cable systems are identical, a description of only one is included here.

Each cable system includes two cables 26 and 28 having respective ends 30 and 32 connected to the same one of the clamps 21. The cable 26 extends upwardly from the sheet 18 and its other end is fixedly connected to the supporting structure 17 as at 33. The other cable 28 extends upwardly through a suitable guide 35 secured on a front wall of the ram 12 and then through a series of three pulleys 38, 40 and 42 alternately positioned on the supporting structure 17 and the ram 12. The pulleys 38 and 42 are fixed on the supporting structure 17 and the pulley 40 is fixedly positioned on the ram 12 as by a rearwardly directed bracket 12a. A remote end 43 of the cable 28 is connected to a dead end support 46 extending rearwardly from the ram 12.

Figure 4:
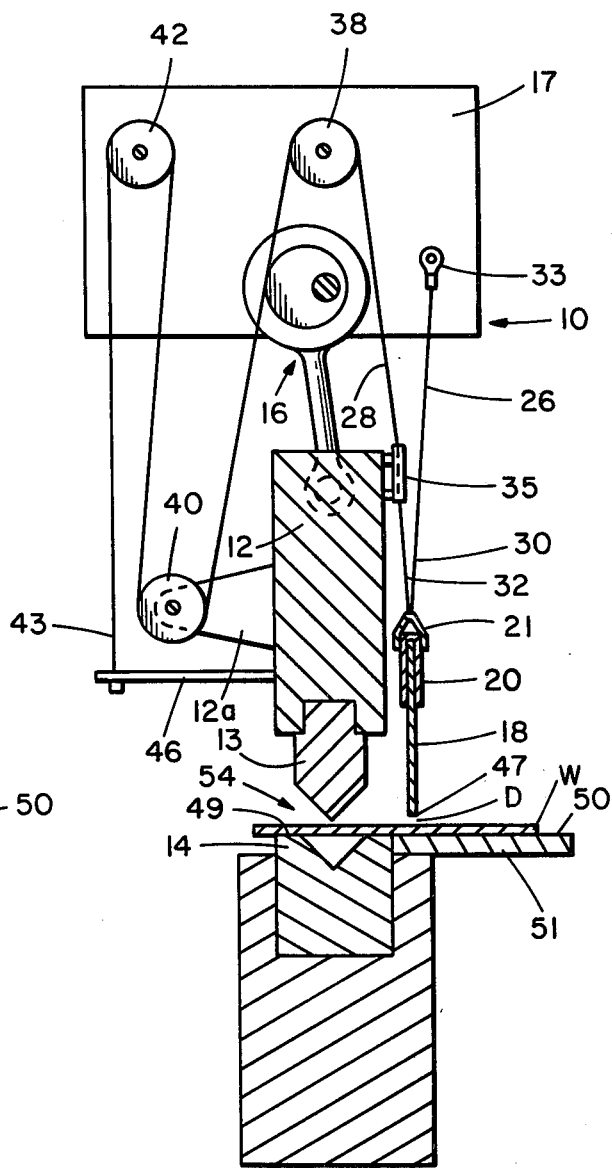
FIG. 4 is a view similar to FIG. 3 but with the ram about to engage the workpiece.

Initially, when the ram 12 is at the top position of its work cycle as shown in FIGS. 1 and 3, the cable 26 is held fast by the weight of the sheet 18, and its length is adjusted to provide a predetermined distance D between a lower edge 47 of the sheet 18 and a coplanar surface defined by an upper surface 49 of the bed 14 and an upper surface 50 of a work ledge 51. The distance D is selected to permit a workpiece 52 to slidably pass beneath the lower edge 47 of the sheet 18, as seen in FIGS. 1, 3, and 4, with a small clearance. The small clearance between an upper surface of the workpiece 52 and the edge 47 prevents the operator, who controls a rear portion of the workpiece 52, from inadvertently sliding his hands under the sheet 18 and into a work area 54 of the press which comprises the space behind the sheet 18 in the path of movement of the ram 12.

Figure 5:
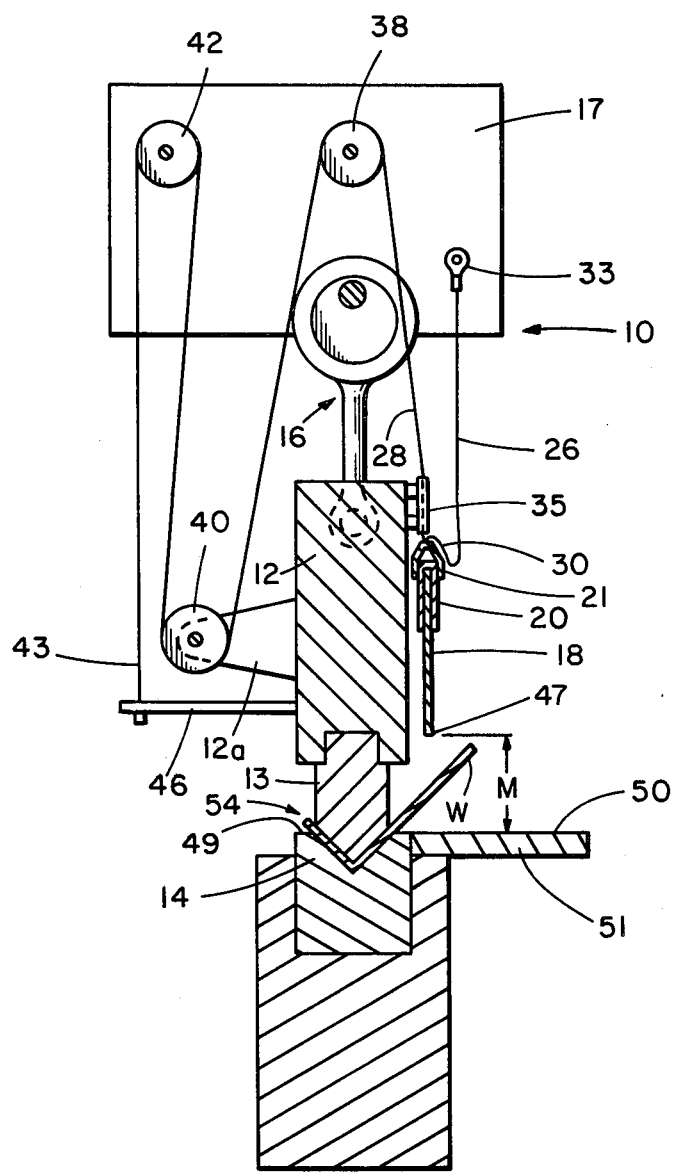
FIG. 5 is a side view similar to FIGS. 3 and 4 but with the ram at the bottom of its stroke as in FIG. 2.

As shown in FIGS. 1 and 3, with the ram 12 at the top of its stroke, the cable 28 is somewhat slack and, as the ram 12 moves downwardly, the sheet 18 remains in place while the slack in the cable 28 is taken up by movement of the pulley 40 and the cable end 43 away from the pulleys 38 and 40. At or about the workengaging position of the stroke, as shown in FIG. 4, the cable 28 becomes taut. The sheet 18 has not yet moved and the cable 26 is still taut. During continued downward movement of the ram 12 from the position of FIG. 4 to that of FIG. 5, the cable 28 is pulled through the pulleys 38, 40, and 42 as the end 43 thereof and the pulley 40 move further downward with the ram 12 causing the sheet 18 to move upwardly. The cable 26 now becomes slack as shown in FIGS. 2 and 5. At the bottom of the stroke, the lower edge 47 of the sheet 18 attains a maximum displacement M from the coplanar surface as shown in FIG. 5.

As the ram 12 begins to return to its initial uppermost position, the end 43 of the second cable 28 and the pulley 40 move upwardly and the cable 28 threads through the pulleys 38, 40, and 42 permitting the sheet 18 to move downwardly due to gravity. The cable 28 moves until the slack in the cable 26 is taken up. The lower edge 47 of the sheet 18 is now displaced from the surface 50 by the predetermined distance D.

Before the sheet 18 returns to its initial position, the operator can reposition the workpiece on the bed in preparation for the next stroke of the ram 12. If the fabrication of the workpiece W is completed, the operator can remove the workpiece W, before the sheet 18 returns to its initial position. It is envisioned that the sheet 18 contact the workpiece W during its manipulation by the operator. Accordingly, the sheet 18 is preferably only held by the cables, and when the workpiece W is removed from the work area 54, for example, contact between the workpiece W and the sheet 18 will merely cause the sheet 18 to be pulled away from the work area temporarily. After contact between the workpiece W and the sheet 18, is terminated the force of gravity will restore the sheet 18 to its initial plumb position.

The upward and downward velocity of the sheet 18 is greater than the respective downward and upward velocity of the ram 12, and the vertical displacement of the sheet 18 is proportionately greater than the vertical displacement of the ram 12. The differences in velocities and vertical displacements are provided by the mechanical advantage provided by the pulley system including the cables 28. The mechanical advantage of the pulley system enables the sheet 18 to be moved away from the work area 54 near the surface of the bed 14 with a velocity proportionately greater than the downward velocity of the ram 12 and to be sufficiently vertically displaced from the surface 48 when the workpiece needs to be manipulated. Thus the safety guard provides protection to the operator and allows the workpiece W to move in the work area 54 and upwardly from the work ledge 51 during the forming process with a minimum of obstruction by the sheet 18 of the safety guard.

FIGS. 3, 4 and 5 show a pulley system having a mechanical advantage of 2.5 which means that after the slack is removed in the second cable 28 the distance of downward or upward movement of the other end 48 of the second cable 28 at the end 44 is translated into 2.5 times the distance of respective upward or downward movement of the one end 32 of the second cable 28 and the edge 47 of the sheet 18.

The number of pulleys may be modified as needed to insure that the lower edge 47 of the sheet 18 moves upwardly from the coplanar surface with the desired velocity and attains a desired clearance from the workpiece W during the forming process when a rear portion of the workpiece W might extend above the coplanar surface as seen in FIGS. 2 and 5.

While the preferred embodiments of the present invention have been shown and described herein, the use of spring loaded connectors can be used to eliminate the appearance of slack in the cables. Accordingly, it is obvious that many structural details may be changed without departing from the spirit and scope of the appended claims.

I claim:

1. A safety guard for use with a press brake or the like having a supporting structure, a bed fixed with respect to and below at least a portion of the supporting structure, and a ram carried by the supporting structure, and reciprocable in a path between an uppermost position above the bed through a workpiece-engaging position to a lowermost position after performing a fabricating operation on a workpiece positioned on the bed, said safety guard comprising a protective sheet disposed, when the ram is in its uppermost position, in a guarding position with respect to the path of reciprocation of the ram and with a lower edge of the sheet positioned a predetermined distance above an upper surface of the bed thereby to define an opening of sufficient width to permit a workpiece to be passed through the opening onto the bed but of insufficient width for passage of an operator's hand, and means drivingly connecting the ram to the sheet for starting upward movement of the sheet to widen the opening only when the ram nears the bed during the downward portion of its stroke and continuing to move the sheet upwardly to a maximum displacement from the upper surface of the bed when the ram is at its lowermost position thereby to permit manipulation of the workpiece during its fabrication by the ram, said means effecting a return movement of the sheet to its initial position as the ram returns to its uppermost position.

2. A safety guard as in claim 1 wherein said means includes a first means interconnecting the supporting structure and sheet for holding the sheet in its initial guarding position against the force of gravity, and a second means operatively connected to the supporting structure, ram, and sheet for moving the sheet upwardly of the bed as the ram moves downwardly.

3. A safety guard as in claim 2 wherein the first means comprises a first cable means suspending the sheet from the supporting structure.

4. A safety guard as in claim 2 wherein the second means includes means for moving the sheet vertically through a proportionately greater distance than movement of the ram.

5. A safety guard as in claim 4 wherein the first cable means includes a pair of first cables directly suspending the sheet from the supporting structure, the first cables being connected respectively to opposite end portions of the sheet.

6. A safety guard as in claim 2 wherein the second means comprises a second cable means including a cable having one end connected to the sheet and passing through a pulley on the supporting structure, the other end of the cable being secured to the ram.

7. A safety guard as in claim 6 wherein the second cable is slack when the ram is in its uppermost position and becomes taut to lift the sheet as the ram nears the bed during the downward portion of its stroke.

8. A safety guard as in claim 2 wherein the second means comprises a second cable means including a cable having one end connected to the sheet and passing through a first pulley on the supporting structure, a pulley on the ram, and a second pulley on the supporting structure, the other end of the cable being secured to the ram.

9. A safety guard as in claim 8 wherein the second cable means comprises two cables connected respectively to opposite end portions of the sheet.

* * * * *